United States Patent
Goyal

(10) Patent No.: US 11,537,619 B1
(45) Date of Patent: Dec. 27, 2022

(54) REPLICA GROUP MODIFICATION IN A DISTRIBUTED DATABASE

(71) Applicant: Amazon Technologies, Inc., Seattle, WA (US)

(72) Inventor: Dumanshu Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 463 days.

(21) Appl. No.: 16/176,629

(22) Filed: Oct. 31, 2018

(51) Int. Cl.
| | |
|---|---|
| *G06F 16/21* | (2019.01) |
| *G06F 16/27* | (2019.01) |
| *G06F 16/2455* | (2019.01) |
| *G06F 16/907* | (2019.01) |

(52) U.S. Cl.
CPC ...... *G06F 16/24568* (2019.01); *G06F 16/219* (2019.01); *G06F 16/278* (2019.01); *G06F 16/907* (2019.01)

(58) Field of Classification Search
CPC ............. G06F 16/24568; G06F 16/907; G06F 16/219; G06F 17/278; G06F 16/278
USPC ........................................................ 707/609
See application file for complete search history.

(56) References Cited

U.S. PATENT DOCUMENTS

| | | | | |
|---|---|---|---|---|
| 5,765,171 A | * | 6/1998 | Gehani | .................. G06F 16/27 707/E17.032 |
| 8,132,046 B2 | | 3/2012 | Varghese | |
| 8,335,765 B2 | | 12/2012 | Sivasubramanian et al. | |
| 8,386,540 B1 | | 2/2013 | McAlister et al. | |
| 8,595,547 B1 | * | 11/2013 | Sivasubramanian | ....................... G06F 11/1451 714/6.23 |
| 8,676,851 B1 | * | 3/2014 | Nesbit | ................. G06F 16/1774 707/791 |
| 9,069,827 B1 | * | 6/2015 | Rath | .................... G06F 11/2094 |
| 9,817,727 B2 | | 11/2017 | McAlister et al. | |
| 9,934,107 B1 | | 4/2018 | Chikkanayakanahally et al. | |
| 2011/0282836 A1 | * | 11/2011 | Erickson | ................. G06F 16/27 707/622 |

OTHER PUBLICATIONS

U.S. Appl. No. 17/349,786, dated Jun. 16, 2021, Sudipto Das.
U.S. Appl. No. 17/349,790, dated Jun. 16, 2021, Sudipto Das.

* cited by examiner

*Primary Examiner* — Kannan Shanmugasundaram
(74) *Attorney, Agent, or Firm* — Robert C. Kowert; Kowert, Hood, Munyon, Rankin & Goetzel, P.C.

(57) ABSTRACT

Methods, systems, and computer-readable media for replica group modification in a distributed database are disclosed. One or more stream processors write elements of a data stream to a plurality of replicas in a replica group. A control plane adds an identifier of a new replica to membership metadata for the replica group. The control plane also generates a new version number for the membership metadata that now includes the new replica. The stream processor(s) write new elements of the data stream to the replica group including the new replica. Write requests to the replica group comprise the new version number, and successful writes of the new elements are acknowledged by the replicas based at least in part on the new version number.

20 Claims, 10 Drawing Sheets

REPLICA GROUP MODIFICATION IN A DISTRIBUTED DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1A:
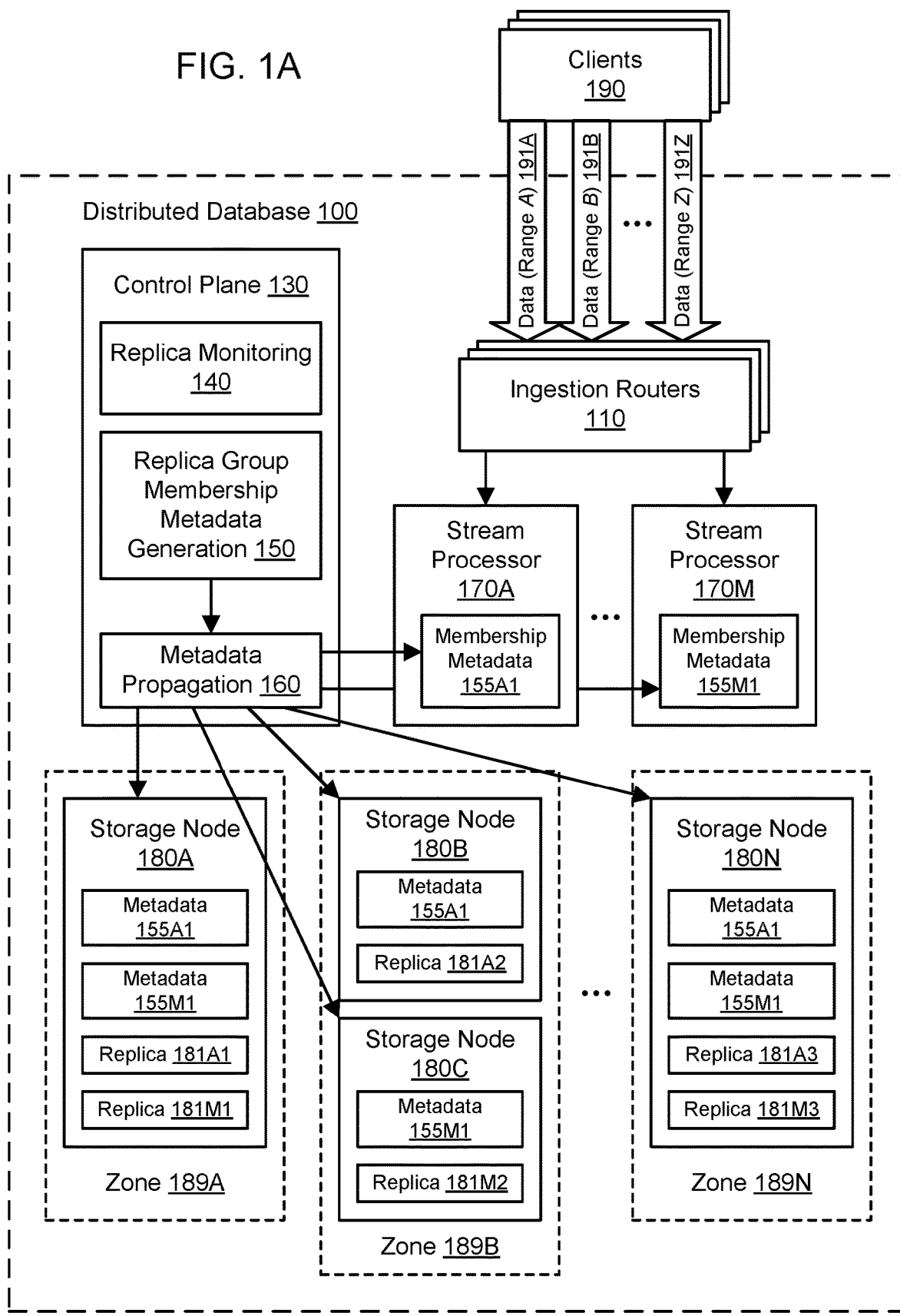
FIG. 1A and FIG. 1B illustrate an example system environment for replica group modification in a distributed database, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for replica group modification in a distributed database are described. A distributed database may include a set of stream processors, also referred to as writers, that process one or more data streams in a distributed manner. The distributed database may also include a set of storage nodes that are distributed across various data centers, availability zones, or other logical or geographical locations. The storage nodes may offer low-latency access to a "hot tier" of data, such as the most recent data elements from the stream(s). A stream processor may perform reordering, deduplication, and other transformations on time series data before writing the data to a group of replicas on particular storage nodes. In one embodiment, a replica may become unreachable or may otherwise fail. In one embodiment, the number of replicas in the replica group may become too small for the needs of users, e.g., for the amount of queries being performed on the data. To add a replacement replica or an additional replica, a control plane may initialize the new replica, generate updated membership metadata for the replica group, and propagate the metadata to the stream processor and to the replicas themselves. The updated metadata may include an incremented version number for the replica group to indicate a state transition. The stream processor may then begin writing new data from the stream to the new replica. Write requests by the stream processor may include the version number, and a storage node may reject a write request if the version number is outdated. To ensure that the replicas are eventually consistent, the new replica may be backfilled with older data from one or more of the existing replicas. In one embodiment, once the new replica has been sufficiently completed with older data elements, it may be marked as eligible for queries by a query processor. Queries may also use version numbers for the replica group to ensure that the query processor and the queried replica are both up-to-date. Using the techniques described herein, a distributed group of replicas may be repaired or scaled while maintaining high availability of access to data, low latency of access to data, and eventual consistency of the data across the various replicas.

A data stream may represent high-throughput time-series data. A data stream may be partitioned both spatially (e.g., based on keys or other ranges of data) and temporally (e.g., with the data elements being timestamped or ordered temporally) into two-dimensional partitions referred to as tiles. A given tile may be represented in the database by a plurality of replicas, and the replicas in such a group may eventually represent the same content. Replicas within the same replica group may be located in different data centers, availability zones, or other logical or geographical locations to ensure high availability in the case of replica failure. However, the replicas may lack a consensus mechanism that can address replica failure. Using the techniques described herein, a mechanism external to the replicas may manage a repair process. In one embodiment, the repair or addition of replicas using the techniques described herein may not impact customer workloads for ingestion of new data. In one embodiment, the repair or addition of replicas using the techniques described herein may not impact customer workloads for queries of data. In one embodiment, the repair or addition of replicas using the techniques described herein may leverage the capabilities of the underlying storage nodes even though the storage nodes may not have a transactional log and may be unaware of their role in a replica group. A repaired or upscaled replica group may eventually converge for a given dataset while newly ingested data is written to the group, including the new replica. In one embodiment, a new replica may eventually be available to serve customer queries with low latency and an upper bound of staleness.

As one skilled in the art will appreciate in light of this disclosure, embodiments may be capable of achieving certain technical advantages, including some or all of the following: (1) improving the scalability of a distributed database by permitting the addition of replicas to replica groups; (2) improving the availability of a distributed database by permitting the addition of replicas without taking the database offline; (3) improving the reliability of a distributed database by enabling failed replicas to be replaced while keeping older replicas in the same replica group online; (4) improving the consistency of a distributed database by backfilling from older replicas to ensure that newer replicas are eventually consistent; (5) improving the use of network resources by permitting a new replica to be backfilled directly from an older replica without using a control plane as an intermediary for data transfer; and so on.

Figure 1B:
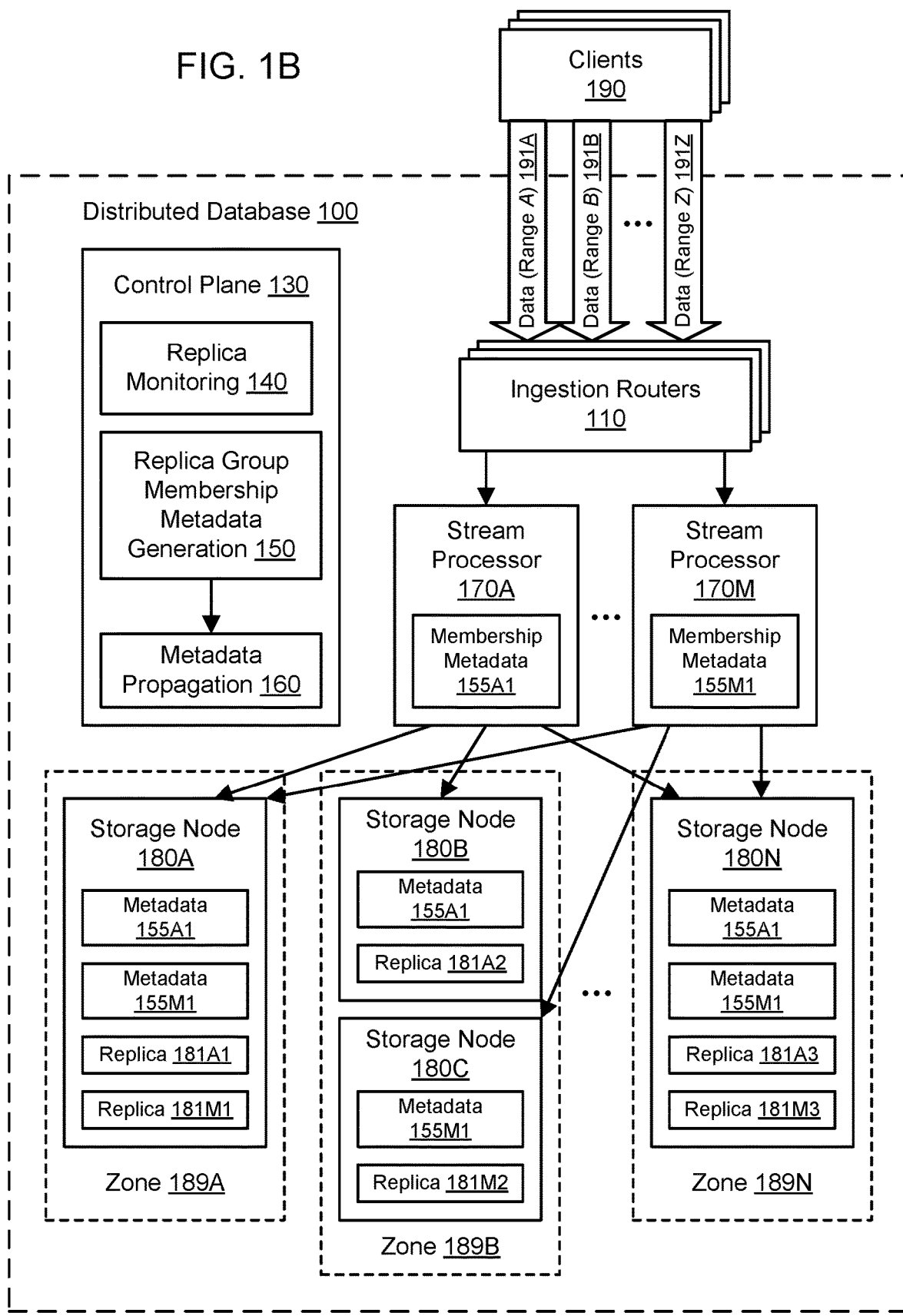

FIG. 1A and FIG. 1B illustrate an example system environment for replica group modification in a distributed database, according to one embodiment. In one embodiment, one or more streams of data may be provided to a distributed database 100 by a set of clients 190. Data elements of the stream(s) may be provided to the database 100 over time, such that some elements may be older and some elements may be newer. Clients 190 may provide data streams for various ranges of data, such as data (range A) 191A and data (range B) 191B through data (range Z) 191Z. A range may represent a time series or some other partition of a larger dataset. Time-series data may include a stream or sequence of data elements that have timestamps as well as tags and/or other metadata. The distributed database 100 may divide the data from the clients 190 into non-overlapping partitions. In one embodiment, the ingested data may be spatially partitioned according to the time series or range of the data, one or more tags associated with the data, the region that produced the data, the category to which the data belongs, and/or other suitable metadata. If the ingested data represents time-series data, then a partition may include one time series or multiple time series.

A fleet of ingestion routers 110 may take elements of the data 191A-191Z published by clients 190 and route those elements to appropriate stream processors 170A-170M. In one embodiment, the data may be routed through one or more intermediate components, such as a set of durable partitions managed by a storage service or a set of durable shards managed by a streaming service. The data 191A-191Z may be routed according to routing metadata, e.g., that maps different time series or ranges of the data to different stream processors.

The distributed database 100 may include a set of stream processors 170A-170M (also referred to as writers or stream processing nodes) that process data in a distributed manner. In one embodiment, for example, a stream processor may perform reordering, deduplication, aggregation of different time periods, and other transformations on time series data before storing the data using storage nodes of the distributed database 100. In one embodiment, the distributed database 100 may have a one-to-one mapping of data partitions to stream processors. By restricting a given series or range of the data to a single stream processing node, tasks such as reordering and deduplication may be simplified. In one embodiment, the stream processors 170A-170M may send the data to one or more data consumers, such as one or more storage nodes 180A-180N that implement a "hot tier" of the distributed database 100. The hot tier may include data that is expected to be in higher demand than a "cold tier" of data. For example, the hot tier may be used to store newer elements of the data 191A-191Z, while older elements may be migrated to the cold tier. The hot tier may offer high availability and low latency for both ingestion and queries.

In one embodiment, a time series or range of data may be replicated across the hot tier using multiple replicas. The replicas may represent two-dimensional tiles, such that the data is partitioned both spatially (as described above) and temporally (by timestamps, order of receipt, or other time-based values). For example, data belonging to a particular partition or spatial range as well as a particular window of time may be replicated using a particular number of replicas (e.g., three) belonging to a particular replica group. For enhanced durability, replicas in a replica group may be stored on different storage nodes and/or in different availability zones or other geographical zones 189A-189N. For example, three separate replicas 181A1, 181A2, and 181A3 of the same tile may be stored on storage nodes 180A, 180B, and 180N in different zones 189A, 189B, and 189N. Similarly, three separate replicas 181M1, 181M2, and 181M3 of another tile may be stored on storage nodes 180A, 180C, and 180N in the different zones 189A, 189B, and 189N. In one embodiment, a given storage node may store replicas of different tiles, e.g., storage nodes 180A and 180N. However, individual replicas may become inaccessible or otherwise fail, or the number of replicas in a replica group may become too small for the needs of the data. Using the techniques described herein, the hot tier may be repaired by replacing failed or inaccessible replicas or upscaled by adding new replicas (without necessarily removing old replicas). The repair and upscaling may be performed efficiently while maintaining high availability and low latency and such that a replica group with a new replica is eventually consistent.

A control plane 130 of the distributed database 100 may manage the repair and upscaling of replica groups. In one embodiment, the control plane 130 may include a replica monitoring component 140. In one embodiment, the replica monitoring component 140 may determine whether a particular replica has become inaccessible for writes and/or reads or has otherwise failed. For example, the replica monitoring component 140 may poll storage nodes or use heartbeat data to determine when replicas are inaccessible. In one embodiment, the replica monitoring component 140 may determine whether a replica group has a sufficient number of replicas to meet the needs of the data associated with the replica group, e.g., using performance metrics for storage nodes, stream processors, or query processors. For example, the metrics may indicate the throughput of data or the utilization of memory resources or processor resources. As another example, the metrics provided by one or more query processors may indicate that the latency of queries exceeds a threshold and thus that the number of replicas in the replica group is insufficient for the volume of queries. In one embodiment, the replica monitoring 140 may determine when to initiate the repair or upscaling of a replica group based on automated analysis. In one embodiment, user input may initiate the repair or upscaling of a replica group.

A replica group may be associated with replica group membership metadata. The metadata for a replica group may include addresses or other identifying characteristics of the particular replicas in the group, e.g., of the storage nodes that host the replicas. The metadata for a replica group may also be associated with a version number. As will be discussed in greater detail below, the version numbers of membership metadata may be incremented to transition the replica group from one state to another state, and the version numbers may be used at various components of the database 100 to ensure that ingestion and query processes are being performed using up-to-date membership metadata for the replica group. State transitions that impact the membership metadata may include any membership change to the replica group and/or status change to replicas in the group. In one embodiment, state transitions that impact the membership metadata may include any changes to the spatial or temporal boundaries of the tile associated with the replica group.

The control plane 130 may maintain the current version of membership metadata for one or more replica groups, e.g., using a durable store for the metadata. The durable store may support atomic updates to the metadata for a replica group. In one embodiment, the control plane 130 may include a component 150 for replica group membership metadata generation. The metadata generation component 150 may create and update membership metadata for replica groups. In one embodiment, the control plane 130 may include a component 160 for propagation of membership metadata to various components of the database 100, including stream processors 170A-170M, storage nodes 180A-180N, and query processors (not shown). As shown in FIG. 1A, the metadata propagation 160 may provide a particular version 155A1 of membership metadata for the replicas 181A1, 181A2, and 181A3 to the storage nodes that store those replicas as well as to any stream processors, such as stream processor 170A, that handles the replica group. Similarly, the metadata propagation 160 may provide a particular version 155M1 of membership metadata for the replicas 181M1, 181M2, and 181M3 to the storage nodes that store those replicas as well as to any stream processors, such as stream processor 170M, that handles the replica group. As shown in FIG. 1B, new elements of data may be routed by the stream processors 170A-170M according to the membership metadata 155A1-155M1. For example, stream processor 170A may write new data elements for a particular tile to replica 181A1 on storage node 180A, replica 181A2 on storage node 180B, and replica 181A3 on storage node 180N. Similarly, stream processor 170M may write new data elements for a particular tile to replica 181M1 on storage node 180A, replica 181M2 on storage node 180C, and replica 181M3 on storage node 180N.

In one embodiment, the membership metadata may include a range key (e.g., a hash value) for the tile, a start time for the tile, an end time for the tile, spatial bounds for the tile, and/or other identifying characteristics. In one embodiment, the membership metadata may include a status (e.g., "active") of the replica group. In one embodiment, the membership metadata may include a list of replicas, where each replica has a replica identifier, a list of one or more containers, and a status (e.g., "active"). A container may be associated in the metadata with a container identifier and a storage node identifier. The membership metadata may also include a version number or other version identifier. In one embodiment, the version number may increase monotonically as changes to the membership or boundaries of the replica group are implemented.

In one embodiment, the stream processors 170A-170M and/or storage nodes 180A-180N of a distributed database 100 may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the stream processors 170A-170M and/or storage nodes 180A-180N. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. In one embodiment, the functionality of the provider network, such as the distributed database 100, may be offered to clients in exchange for fees.

Figure 8:
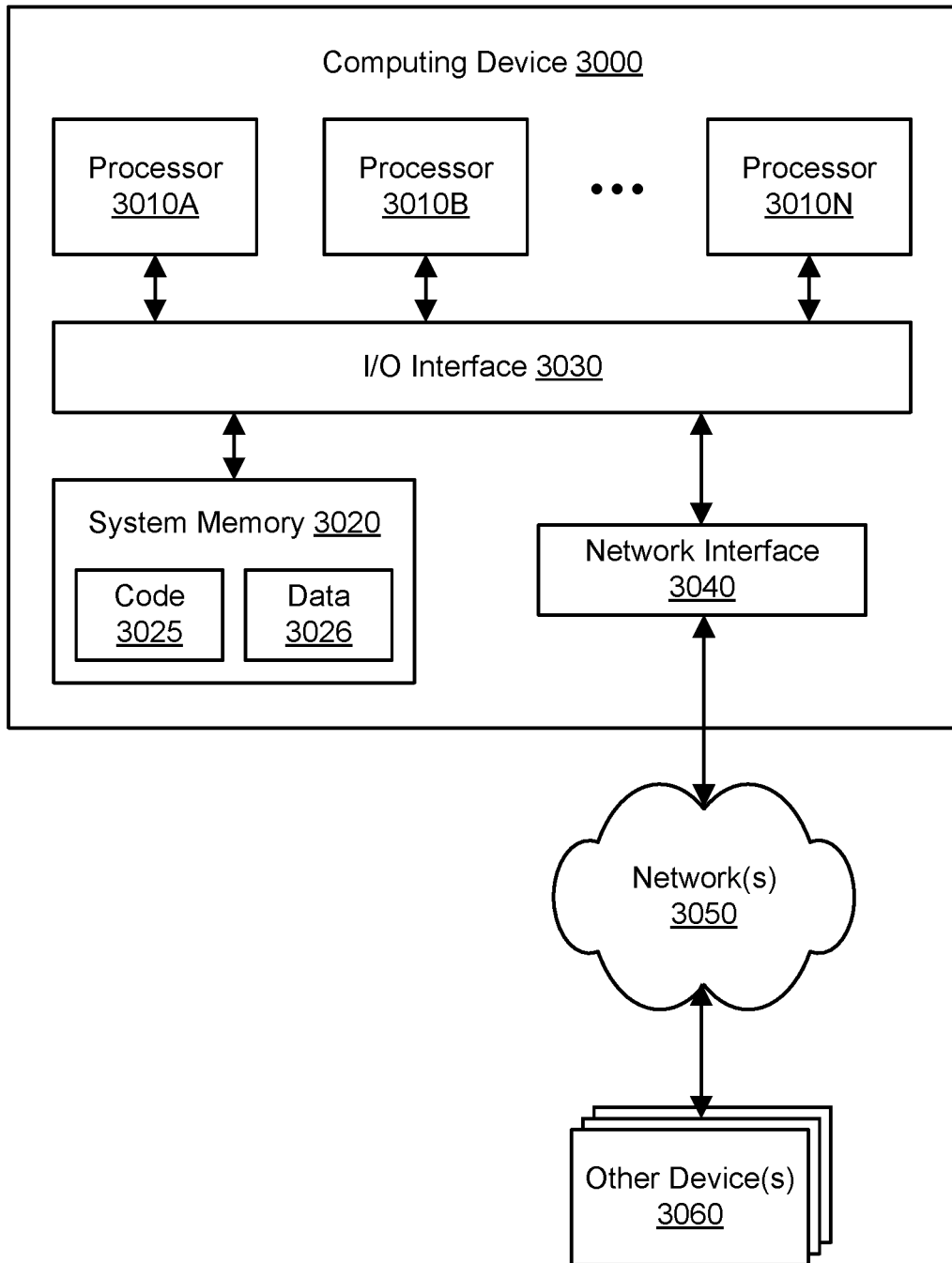
FIG. 8 illustrates an example computing device that may be used in some embodiments.

In various embodiments, components of the distributed database 100, such as the ingestion router fleet 110, control plane 130, stream processors 170A-170M, and/or storage nodes 180A-180N, may be implemented using any suitable number and configuration of computing devices, any of which may be implemented by the example computing device 3000 illustrated in FIG. 8. In some embodiments, the computing devices may be located in any suitable number of data centers or geographical locations such as zones 189A and 189B through 189N. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. In one embodiment, the client devices may be implemented using any suitable number and configuration of computing devices, any of which may be implemented by the example computing device 3000 illustrated in FIG. 8. Clients 190 may convey network-based service requests to the ingestion router fleet 110 via one or more networks, e.g., to supply a stream of data for processing using the stream processors 170A-170M. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
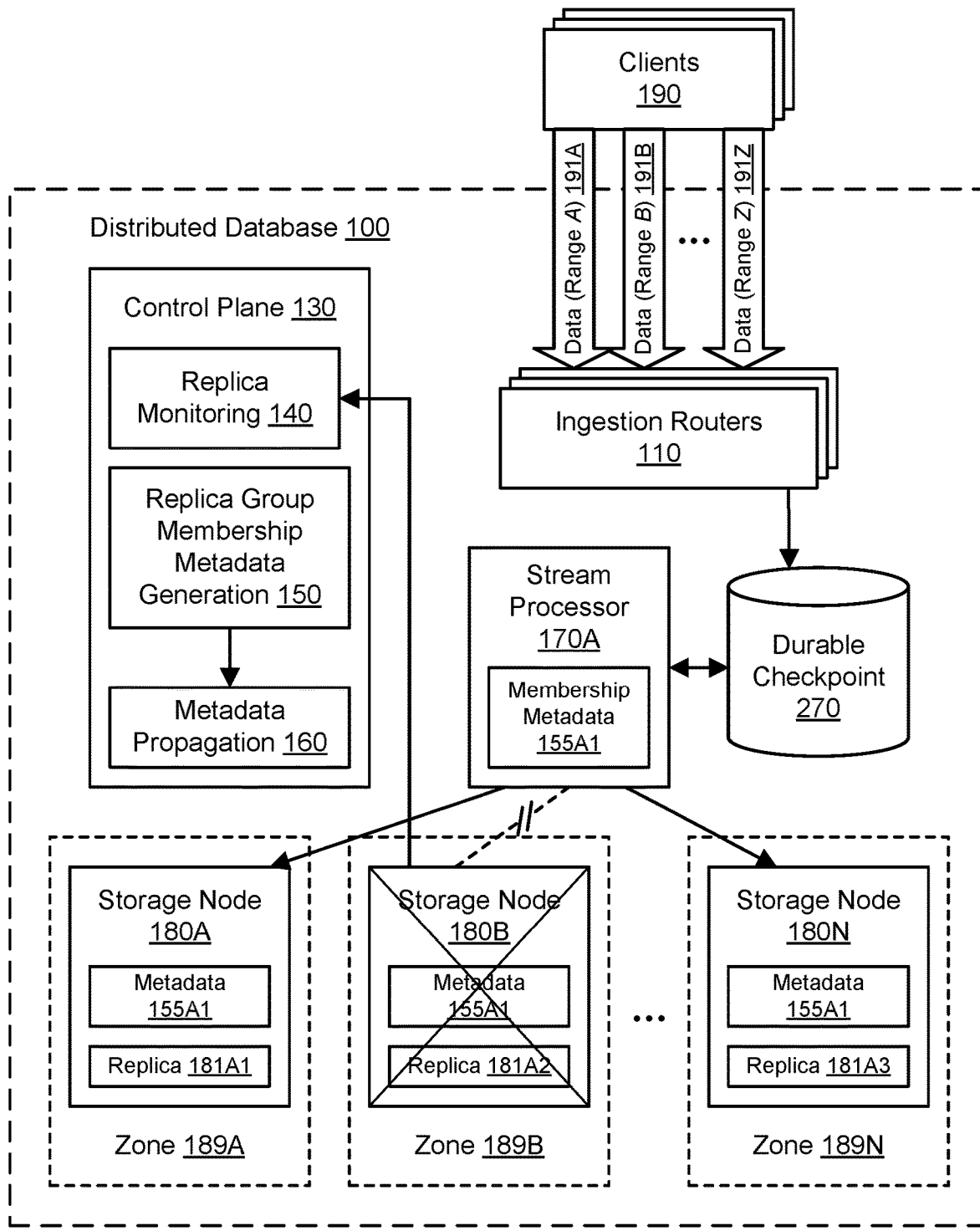
FIG. 2 illustrates further aspects of the example system environment for replica group modification in a distributed database, including a control plane that monitors the distributed database for failed replicas, according to one embodiment.

FIG. 2 illustrates further aspects of the example system environment for replica group modification in a distributed database, including a control plane that monitors the distributed database for failed replicas, according to one embodiment. As discussed above, the control plane 130 may monitor the availability and/or performance of replicas in the distributed database 100. As shown in the example of FIG. 2, at some point after the stream processor 170A has begun replicating a tile across a replica group including replicas 181A1, 181A2, and 181A3, the replica 181A2 may fail. For example, the failure of the replica 181A2 may be due to a hardware or software error of the underlying storage node 180B. The failure of the replica 181A2 may represent a total failure such that the replica is completely inaccessible for writes and/or reads. The failure of the replica 181A2 may be due to a high latency of writes and/or reads at the storage node. Due to detecting the failure of the replica 181A2, the control plane 130 may initiate a repair process for the affected replica group. If different tiles are co-located on the failed storage node, then the control plane 130 may initiate repair processes in parallel for each of the affected replica groups. The repair process may begin by removing the failed replica 181A2 from membership metadata for the replica group. In one embodiment, the failed replica 181A2 or storage node 180B may also be taken offline or decommissioned. In one embodiment, the deletion of a failed replica from the replica group may represent a state transition that triggers the incrementing of the version number and the propagation of updated metadata. The control plane 130 may initiate a similar process for upscaling by increasing the number of replicas in the replica group, except in the upscaling case, no existing replicas need be removed from the replica group.

Figure 3:
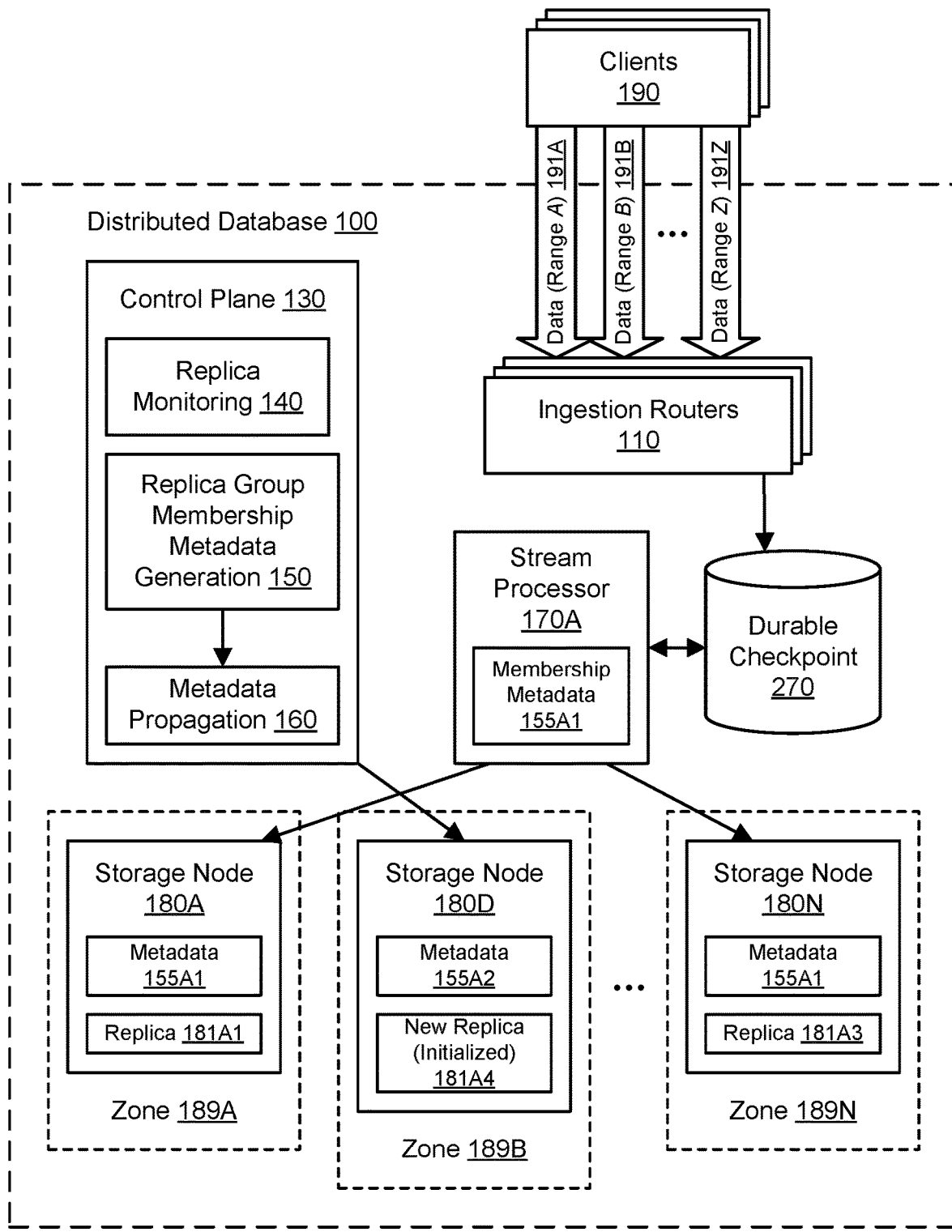
FIG. 3 illustrates further aspects of the example system environment for replica group modification in a distributed database, including initialization of a new replica by the control plane while old replicas continue to receive new data, according to one embodiment.

FIG. 3 illustrates further aspects of the example system environment for replica group modification in a distributed database, including initialization of a new replica by the control plane while old replicas continue to receive new data, according to one embodiment. In one embodiment, the ingestion routers 110 may route data to a durable checkpoint 270 that is then accessed by the stream processor 170A. The durable checkpoint 270 may be implemented using a durable log, one or more database tables, one or more durable shards of a streaming service, and so on. When the stream processor 170A successfully writes a new element of data (or a set of new elements) to all of the replicas in the corresponding replica group, the change may be deemed committed, and then the checkpoint may advance beyond the new element(s). In one embodiment, the committing of new data or the advancement of the checkpoint may be blocked while one or more of the replicas is unable to perform writes or unable to acknowledge the success of write requests. In one embodiment, with the failure of replica 181A2, the stream processor 170A may continue to write new elements of data to the old replicas 181A1 and 181A3, but the changes may not be committed to the durable checkpoint 270 until the full replica group is restored. In one embodiment, the stream processor 170A may include a buffer for new records, and the stream processor may continue to write the new records to existing replicas 181A1 and 181A3 as long as the contents of the buffer have not been exhausted.

To begin the repair or upscaling process, the control plane 130 may select a suitable storage node 180D in the same availability zone 189B (or data center or other geographical zone) as the failed replica 181A2. The control plane 130 may initialize a new replica 181A4 on the selected storage node 180D. The initialized replica 181A4 may represent an empty container that is yet unfilled with any data for the tile. The initialized replica 181A4 may be set as ineligible to serve queries until a later point in the repair or upscaling process. The control plane may initialize the new replica 181A4 with a new version 155A2 of the membership metadata for the replica group. In one embodiment, the new version 155A2 may have an incremented version number with respect to the prior version 155A1. At this point in the repair or upscaling process, the old replicas 181A1 and 181A3 and the stream processor 170A may have the old metadata 155A1. In one embodiment, a write request from a stream processor may include the version number of the metadata for the replica group, and a storage node may perform the write and acknowledge its success if and only if the version number of the write request is equal to the version number at the storage node. However, if the version number of the write request is greater than the version number at the storage node, then the storage node may initially reject the request but ask the stream processor to re-send the request with the up-to-date metadata; the resent request may then be accepted and the metadata updated at the node. Accordingly, a storage node may reject a write request if the request has an outdated version number relative to the version number at the storage node but may eventually accept the request otherwise. In one embodiment, therefore, writes to existing replicas may continue to be successful as long as the stream processor 170A and the storage nodes have the same version 155A1 of the membership metadata for the replica group.

Figure 4:
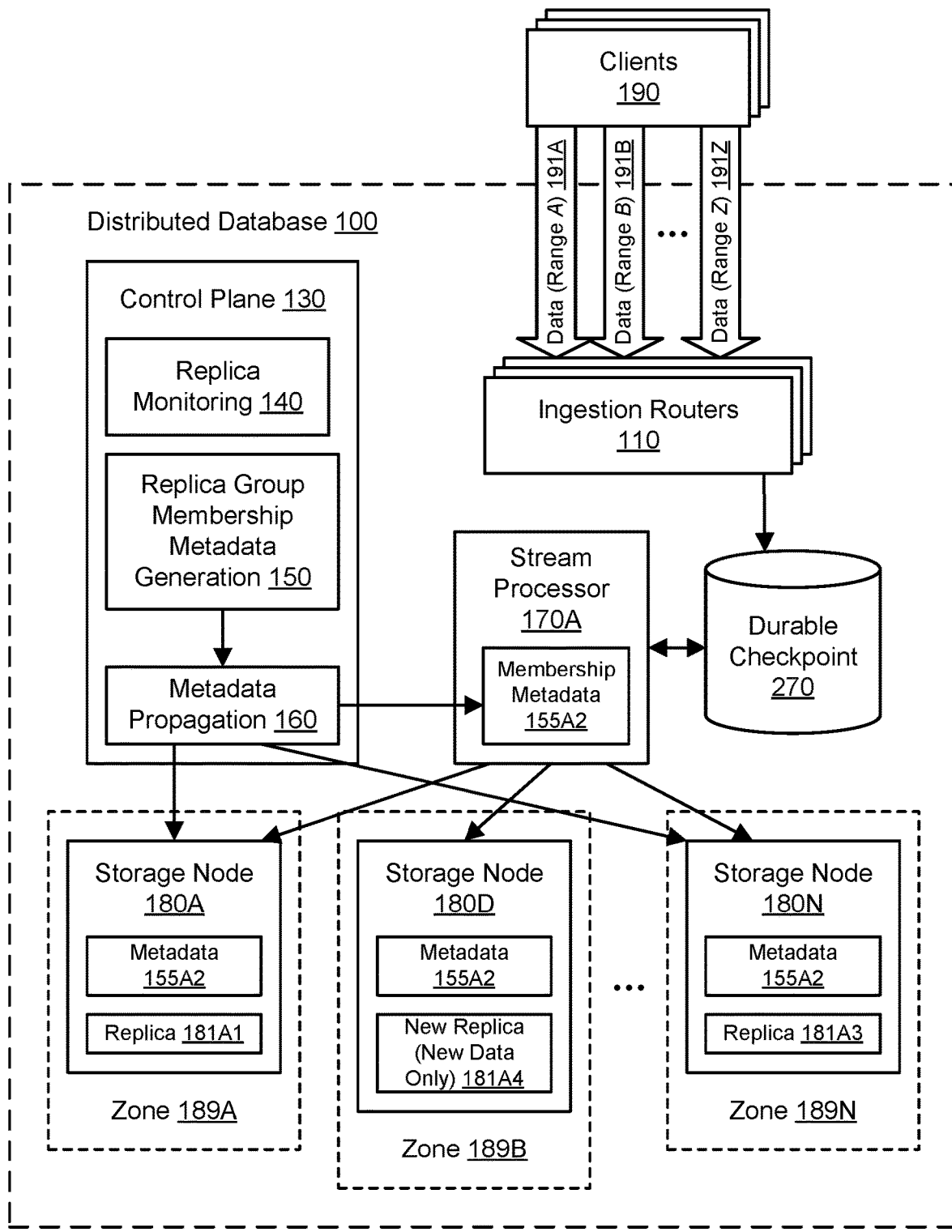
FIG. 4 illustrates further aspects of the example system environment for replica group modification in a distributed database, including propagation of updated membership metadata for a replica group, according to one embodiment.

FIG. 4 illustrates further aspects of the example system environment for replica group modification in a distributed database, including propagation of updated membership metadata for a replica group, according to one embodiment. After the membership metadata has been updated with the new replica 181A4 and the version incremented to version 155A2, the updated metadata may be propagated to other components of the distributed database 100 by the control plane 130. In one embodiment, the metadata propagation 160 may send the updated metadata 155A2 to the old replicas 181A1 and 181A3, with the new replica already having been initialized with the updated metadata. In one embodiment, the replicas 181A1, 181A3, and 181A4 or their host storage nodes may receive and store only a portion of the full membership metadata, e.g., the version number, while being unaware of another portion, e.g., the identities or addresses of the various replicas.

In one embodiment, the metadata propagation 160 may send the updated metadata 155A2 to the stream processor 170A. A write request from a stream processor 170A may include the updated version number of the metadata for the replica group, and a storage node may perform the write and acknowledge its success if and only if the version number of the write request is equal to the version number at the storage node. Accordingly, a storage node may accept a write request from the stream processor 170A if the version number of the updated metadata 155A2 is indicated in the request and if the recipient node also has the updated metadata 155A2. Additionally, a storage node may accept a write request from the stream processor 170A if the updated metadata 155A2 is included in the request and if the recipient node is able to update its outdated metadata 155A1 using the updated metadata from the stream processor. In such a scenario, the storage node may update its membership metadata with the new version number from the write request. However, a storage node may reject a write request from the stream processor 170A if the outdated metadata 155A1 is included in the request and if the recipient node has the updated metadata 155A2. In such a scenario, the storage node may respond with the updated metadata 155A2 with the current version number, the stream processor 170A may update its membership metadata, and the stream processor may re-send the write request with the same updated version number as the storage node. In one embodiment, the stream processor 170A may instead obtain the updated metadata 155A2 from the control plane 130 if a write request is rejected for having an old version number. The updated metadata 155A2 may be pushed by the control plane 130 to the stream processor 170A or may instead be pulled by the stream processor from the control plane.

In one embodiment, for a given version number, a record may be written to some of the existing replicas and not on others, e.g., while the new metadata is being propagated to the storage nodes in the replica group. To mitigate such inconsistencies, the container logic at the storage nodes may perform deduplication by dropping or overwriting duplicate entries. Replicas may be considered eventually consistent with an upper bound. Once all the storage nodes 180A, 180D, and 180N and the stream processor 170A have the updated metadata 155A2, newly ingested data elements may be successfully written to all of the replicas 181A1, 181A3, and 181A4 and thus deemed fully committed. However, the new replica 181A4 may have only the new data from the point at which ingestion was unblocked. As will be described below, additional steps may be taken to ensure that all the replicas in the replica group store the same data, including older data elements.

Figure 5:
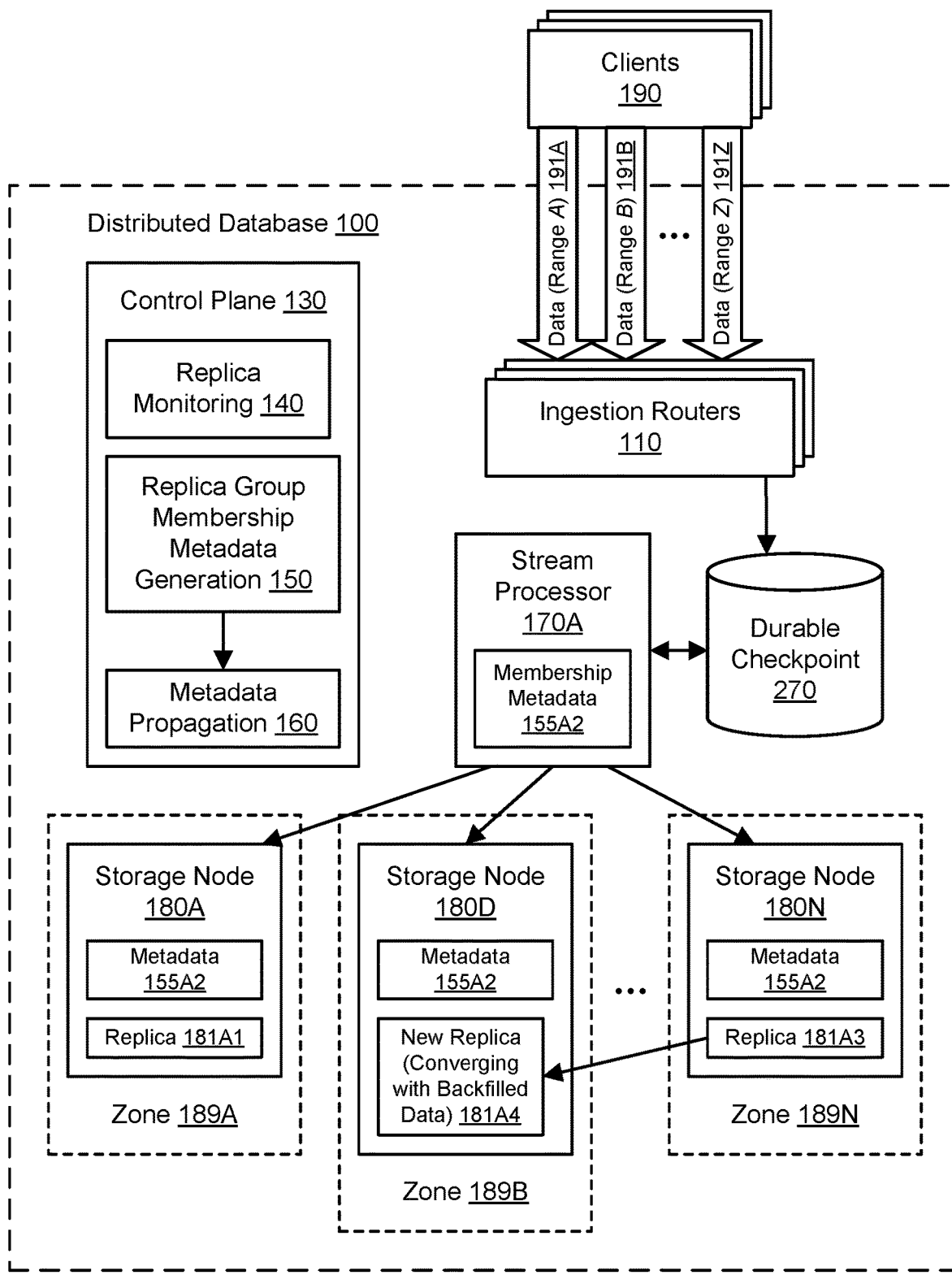
FIG. 5 illustrates further aspects of the example system environment for replica group modification in a distributed database, including backfilling of a new replica using old data from one or more other replicas, according to one embodiment.

FIG. 5 illustrates further aspects of the example system environment for replica group modification in a distributed database, including backfilling of a new replica using old data from one or more other replicas, according to one embodiment. In one embodiment, pending write requests at the old replicas 181A1 and 181A3 may be drained. These pending requests may be associated with the old version number. Once a storage node has processed all of its old requests, it may be eligible to backfill any old data elements in the tile to the new replica 181A4. As shown in the example of FIG. 5, replica 181A3 may be chosen as the source for the backfill operation. In various embodiments, one old replica or multiple old replicas may be selected for a backfill of a new replica, e.g., depending upon the available bandwidth for backfill per storage node, the amount of data to be backfilled, and so on. Such a selected replica may be required to be query-eligible, and so other new replicas may typically be passed over for selection as a backfill source. In one embodiment, the backfill source node may be selected to minimize latency of the operation. To initiate the backfill operation, the control plane 130 may instruct the selected storage node(s) to copy all of the data or a specific range of data from the complete replica(s) to the new and incomplete replica 181A4. The backfill may be performed using query and ingestion APIs (application programming interfaces) of the storage nodes. In one embodiment, deduplication may be performed at the new replica 181A4 to eliminate duplicate records obtained in the backfill. In one embodiment, the data written during the backfill may be deemed immutable. Using one or more backfill operations in this manner, the replica group may eventually converge even with the addition of one or more new replicas to the group while the database 100 is "live" and receiving new data from clients 190.

In one embodiment, tile size may be constrained in order to facilitate replica addition with backfilling while mitigating fragmentation problems in node allocation. In one embodiment, a backfill operation may progress only as fast as the ingestion rate of the new replica, assuming that queries are faster than ingestion. During a backfill, the existing replica may also be ingesting new records. If the existing replica were maxing out the new replica's ingestion rate, then the backfill might never be completed. Such a scenario may be avoided by keeping the tile size small or by reserving a capacity of a storage node for ingestion. In one embodiment, rather than performing a backfill as described above, a give spatial range may be replayed from the durable checkpoint. In one embodiment, the eventual convergence of a new replica may be validated by sampling and comparing data across replicas or comparing data in the hot tier with data in the cold tier. In one embodiment, where no existing replica can serve as the source for a backfill operation, the cold tier may be queried to bootstrap a new replica in the hot tier.

Figure 6:
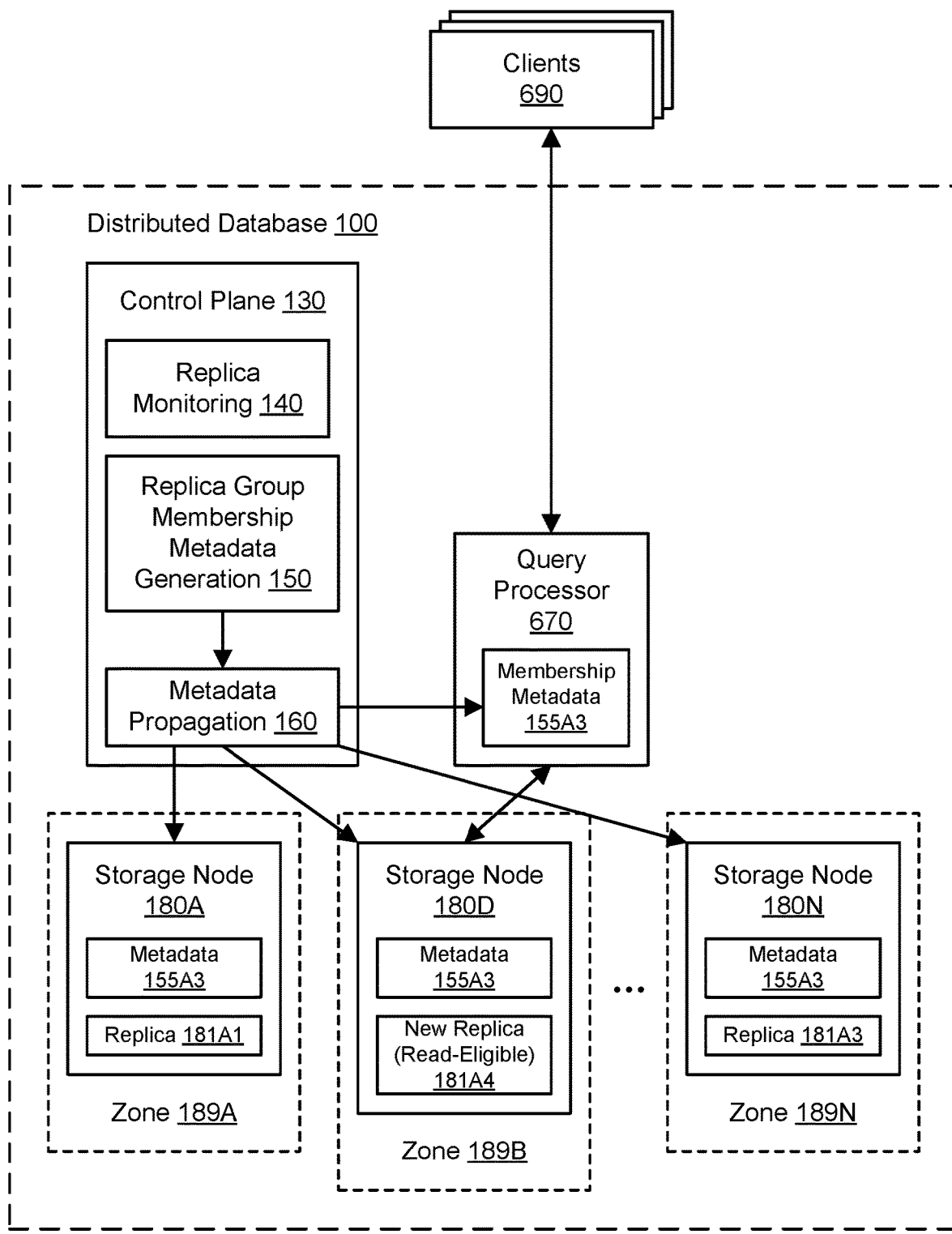
FIG. 6 illustrates further aspects of the example system environment for replica group modification in a distributed database, including querying of a new replica, according to one embodiment.

FIG. 6 illustrates further aspects of the example system environment for replica group modification in a distributed database, including querying of a new replica, according to one embodiment. In one embodiment, the new replica 181A4 may be set as read-eligible or query-eligible after the backfill operation has been completed. In one embodiment, the new replica 181A4 may be set as read-eligible or query-eligible after a sufficient percentage of the backfill operation has been completed. A query processor 670 may receive query requests, e.g., from external clients 690, and may then select the new replica 181A4 to serve those requests. In one embodiment, the query processor 670 may randomly or pseudo-randomly select one of the replicas in a replica group to serve a particular query. The query processor 670 may use the updated membership metadata to choose from among the current set of replicas and route the query to the selected replica.

In one embodiment, the marking of the new replica 181A4 as read-eligible or query-eligible may represent another state transition for the membership metadata. When setting the new replica 181A4 as read-eligible or query-eligible, the membership metadata generation component 150 may increment the version number yet again. The metadata propagation component 160 may then send the newest version number 155A3 to the relevant storage nodes, the query processor 670, and the stream processor 170A. As with write requests, the storage nodes may compare the metadata version number of an incoming query with their local version number and accept or reject the query accordingly. In one embodiment, a storage node may perform the query if and only if the version number of the query request is equal to the version number at the storage node. Accordingly, a storage node may accept a query request from the query processor 670 if the latest metadata 155A3 is included in the request and if the recipient node also has the latest metadata 155A3. Additionally, a storage node may accept a query request from the query processor 670 if the latest metadata 155A3 is included in the request and if the recipient node still has the outdated metadata 155A2. In such a scenario, the storage node may update its membership metadata with the new version number from the query request. However, a storage node may reject a query request from the query processor 670 if the outdated metadata 155A2 is included in the request and if the recipient node has the latest metadata 155A4. In such a scenario, the storage node may respond with the updated version number, the query processor 670 may update its membership metadata with the new version number, and the query processor may re-send the query request with the same updated version number as the storage node. In one embodiment, the query processor 670 may instead obtain the updated metadata 155A3 from the control plane 130 if a query request is rejected for having an old version number.

Figure 7A:
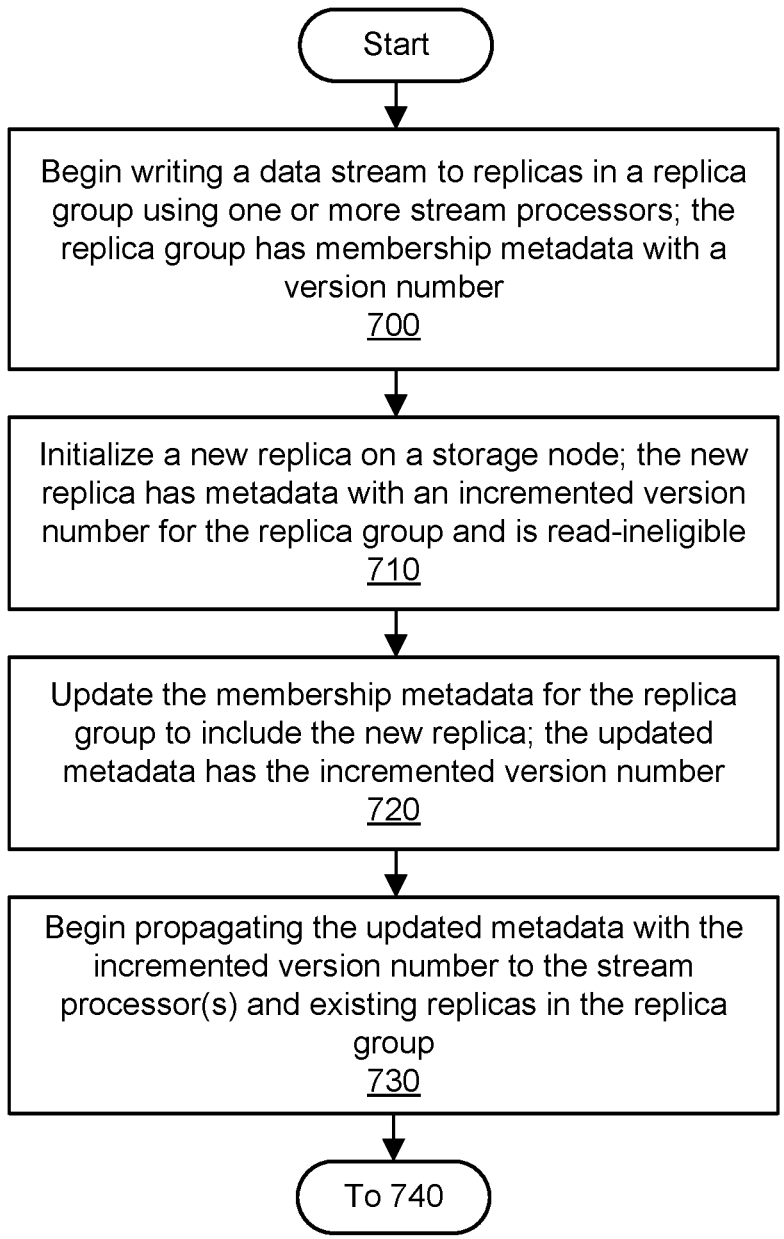
FIG. 7A and FIG. 7B are flowcharts illustrating a method for replica group modification in a distributed database, according to one embodiment.
Figure 7B:
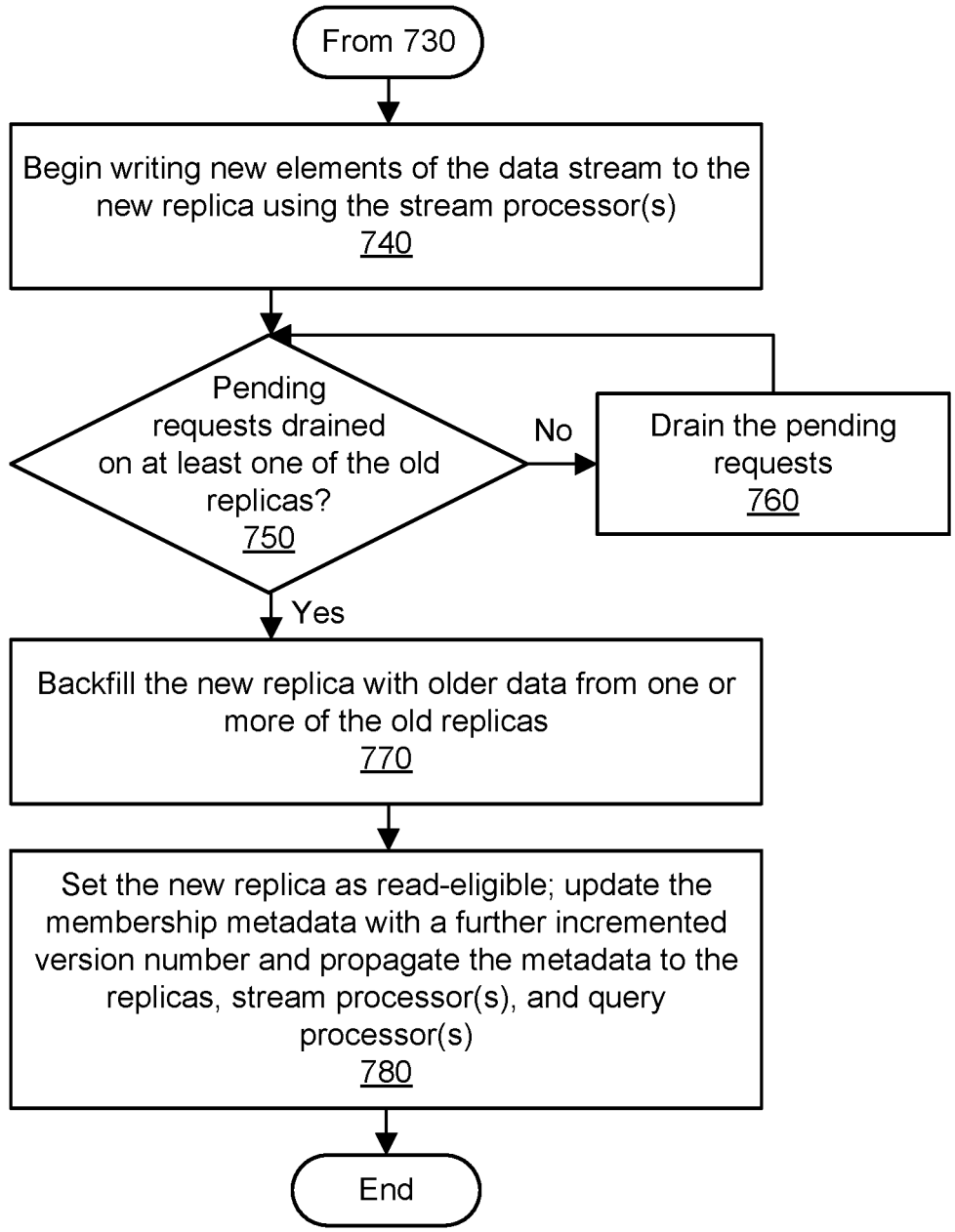

FIG. 7A and FIG. 7B are flowcharts illustrating a method for replica group modification in a distributed database, according to one embodiment. As shown in 700, data elements or records of a data stream may be written to replicas in a replica group. The replicas may be stored using different storage nodes of a distributed database. One or more stream processors may receive the data elements and write them to the replicas. The replica group may be associated with a particular version number (e.g., version 1) of replica group membership metadata. In one embodiment, the version number of a write request may be compared to a local version number by a storage node (or a container of a replica on the storage node) in order to decide whether to proceed with the write. In one embodiment, a write request may be performed if and only if the version number of the request is greater than or equal to the local version number. In one embodiment, a version number beyond the initial version number (e.g., version 1) may indicate a state transition for the replica group.

At some point, a replica may fail, or the replica group may prove too small to adequately serve the volume of queries. To address these problems, a new replica may be added to the storage nodes with the idea that the new replica will be added to the replica group. The new replica may represent a replacement of a failed replica or an increase in the size of the replica group. As shown in 710, a new replica may be initialized on a storage node of the distributed database. In one embodiment, the storage node may be selected based (at least in part) on a zone or data center that hosts the node, such that a replica group with the new replica is geographically and/or logically distributed for availability and durability. The new replica may be initialized by a control plane with an incremented or otherwise larger version number (e.g., version 2) or other indication of the state transition of the replica group (to a state where the new replica is included). The new replica may be initially empty in an initialized container on the selected storage node. The new replica may be marked as read-ineligible.

As shown in 720, the membership metadata of the replica group may be updated to include an identifier of the new replica. The updated metadata may have the same incremented or newer version number (e.g., version 2) or other indication of the state transition as the container for the new replica. As shown in 730, the updated metadata with the incremented version number or other indication of the state transition may be propagated to the stream processor(s) and the existing replicas in the replica group. In one embodiment, the new metadata may first be propagated by the control plane to the existing replicas, and the stream processor(s) may acquire the new metadata from the existing replicas or from the control plane. In one embodiment, the new metadata may first be propagated by the control plane to the stream processor(s), and the existing replicas may acquire the new metadata from the stream processor(s) or from the control plane. In either circumstance, the updated metadata may be received by some components before others.

As shown in 740, if the relevant components have the updated metadata, then the stream processor(s) may begin writing new elements of the data stream to both the new replica and the old replicas. As shown in 750, the method may determine whether at least one of the old replicas has been drained of pending requests associated with the old version number. If not, then as shown in 760, the pending requests may be drained on at least one of the old replicas. As shown in 770, one or more of the old replicas with all pending requests drained may be selected as the source for a backfill operation to copy old records to the new replica. As shown in 780, after the backfill has been completed or performed to a sufficient percentage, the new replica may be marked as read-eligible. In one embodiment, the version number may also be incremented or increased again (e.g., to version 3), or another indication of a state transition may be added to the metadata, to reflect the eligibility of the entire group to serve queries from a query processor. The further updated metadata may be propagated to the replicas, the stream processor(s) and any relevant query processor(s).

Illustrative Computer System

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and memory configured to implement a stream processor configured to write elements of a data stream to a plurality of replicas in a replica group; and
one or more processors and one or more memories that store computer-executable instructions that, if executed, implement a control plane configured to:
cause a new replica to be initialized;
add an identifier of the new replica to membership metadata for the replica group, wherein the membership metadata includes respective identifiers of respective replicas of the replica group; and
generate an incremented version number for the membership metadata that includes the identifier of the new replica, wherein the membership metadata having the incremented version number is provided to at least one of the replicas;
wherein the stream processor is further configured to:
begin writing new elements of the data stream to the replica group including the new replica, wherein write requests from the stream processor comprise respective ones of the new elements and the incremented version number of the membership metadata, and wherein successful writes of the respective ones of the new elements are acknowledged by respective ones of the replicas based at least in part on a comparison of the incremented version number of the membership metadata included as part of the write requests to a local version number of the membership metadata stored at the respective replica, and wherein the replica group is eventually consistent.

2. The system as recited in claim 1, wherein the computer-executable instructions, if executed, cause the control plane to:
detect a failed replica in the replica group; and
remove the failed replica from the membership metadata, wherein the new replica represents a replacement of the failed replica.

3. The system as recited in claim 1, wherein the elements of the data stream are written from one or more existing replicas in the replica group as immutable data to the new replica, wherein the new replica is deemed eligible for queries after the elements of the data stream are written to the new replica, and wherein the computer-executable instructions, if executed, cause the control plane to:
generate a further incremented version number for the membership metadata after the new replica is deemed eligible for queries; and
send the membership metadata having the additional further incremented version number to the replica group.

4. The system as recited in claim 3, further comprising:
one or more processors and memory configured to implement a query processor configured to send a query to the new replica, wherein the membership metadata having the further incremented version number is sent to the query processor, wherein the query includes the further incremented version number, and wherein a response to the query is provided by the new replica based at least in part on the further incremented version number.

5. A method, comprising:
writing, by one or more stream processors, elements of a data stream to a plurality of replicas in a replica group;
adding, by a control plane configured to manage the replica group, an indication of a new replica that has been added by the control plane to the replica group, to metadata for the replica group;
generating, by the control plane, an indication of a state transition for the metadata, wherein the state transition represents the addition of the new replica to the replica group; and
writing, by the one or more stream processors, new elements of the data stream to the replica group including the new replica, wherein write requests to the replica group comprise respective ones of the new elements and the indication of the state transition for the metadata, and wherein successful writes of the respective ones of the new elements are acknowledged by respective ones of the replicas based at least in part on a comparison of the indication of the state transition to an indication of state for the metadata at the respective replica.

6. The method as recited in claim 5, further comprising:
detecting a failed replica in the replica group; and
removing the failed replica from the metadata, wherein the new replica represents a replacement of the failed replica.

7. The method as recited in claim 5, wherein the new replica represents an increase in a size of the replica group.

8. The method as recited in claim 5, further comprising:
writing the elements of the data stream from one or more existing replicas in the replica group to the new replica, wherein the new replica is deemed eligible for queries after the elements of the data stream are written to the new replica;
generating an indication of an additional state transition for the metadata after the new replica is deemed eligible for queries; and
sending the metadata having the indication of the additional state transition to the replica group.

9. The method as recited in claim 8, further comprising:
sending a query from a query processor to the new replica, wherein the metadata having the indication of the additional state transition is sent to the query processor, wherein the query includes the indication of the additional state transition, and wherein a response to the query is provided by the new replica based at least in part on the indication of the additional state transition.

10. The method as recited in claim 5, further comprising:
initializing the new replica, comprising creating a container on a storage node, wherein the container comprises the indication of the state transition.

11. The method as recited in claim 5, wherein the replicas comprise copies of time-series data.

12. The method as recited in claim 5, wherein the plurality of replicas are distributed across a plurality of availability zones.

13. The method as recited in claim 5, further comprising:
sending the metadata having the indication of the state transition to the stream processor from the control plane; and
sending the metadata having the indication of the state transition to one or more existing replicas in the replica group from the control plane or from the stream processor.

14. The method as recited in claim 5, further comprising:
sending the metadata having the indication of the state transition to one or more existing replicas in the replica group from the control plane; and
sending the metadata having the indication of the state transition to the stream processor from the one or more existing replicas in the replica group or from the control plane.

15. One or more non-transitory computer-readable storage media storing program instructions that, when executed on or across one or more processors, perform:
writing, by one or more stream processors, elements of a data stream to a plurality of replicas in a replica group;
adding, by a control plane configured to manage the replica group, an identifier of a new replica that has been added by the control plane to the replica group, to membership metadata for the replica group;
generating, by the control plane, an incremented version number for the membership metadata that includes the identifier of the new replica; and
writing, by the one or more stream processors, new elements of the data stream to the replica group including the new replica, wherein write requests to the replica group comprise respective ones of the new elements and the incremented version number for the membership metadata, and wherein successful writes of the respective ones of the new elements are acknowledged by respective ones of the replicas based at least in part on a comparison of the incremented version number of the membership metadata included as part of the write requests to a local version number of the membership metadata stored at the respective replica.

16. The one or more non-transitory computer-readable storage media as recited in claim 15, wherein the program instructions, when executed on or across the one or more processors, perform:
detecting a failed replica in the replica group; and
removing the failed replica from the membership metadata, wherein the new replica represents a replacement of the failed replica.

17. The one or more non-transitory computer-readable storage media as recited in claim 15, wherein the program instructions, when executed on or across the one or more processors, perform:
writing old elements of the data stream from an external storage system to the new replica, wherein the new replica is deemed eligible for queries after the old elements of the data stream are written to the new replica;
generating a further incremented version number for the membership metadata after the new replica is deemed eligible for queries; and
sending the membership metadata having the further incremented version number to the replica group.

18. The one or more non-transitory computer-readable storage media as recited in claim 15, wherein the program instructions, when executed on or across the one or more processors, perform:
writing the elements of the data stream from one or more existing replicas in the replica group to the new replica, wherein the new replica is deemed eligible for queries after the elements of the data stream are written to the new replica;
generating a further incremented version number for the membership metadata after the new replica is deemed eligible for queries; and
sending the membership metadata having the further incremented version number to the replica group.

19. The one or more non-transitory computer-readable storage media as recited in claim 18, wherein the program instructions, when executed on or across the one or more processors, perform:
draining one or more pending write requests on the one or more existing replicas prior to writing the elements of the data stream from the one or more existing replicas in the replica group to the new replica.

20. The one or more non-transitory computer-readable storage media as recited in claim 18, wherein the program instructions, when executed on or across the one or more processors, perform:
sending a query from a query processor to the new replica, wherein the membership metadata having the further incremented version number is sent to the query processor, wherein the query includes the further incremented version number, and wherein a response to the query is provided by the new replica based at least in part on the further incremented version number.

* * * * *